United States Patent
Bauman et al.

(10) Patent No.: US 8,958,789 B2
(45) Date of Patent: Feb. 17, 2015

(54) DISTRIBUTED DIGITAL ANTENNA SYSTEM

(75) Inventors: Donald R. Bauman, Waseca, MN (US); Philip M. Wala, Waseca, MN (US); Jeffrey O. Brennan, Waseca, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 1787 days.

(21) Appl. No.: 10/395,743

(22) Filed: Mar. 24, 2003

(65) Prior Publication Data

US 2004/0106435 A1   Jun. 3, 2004

Related U.S. Application Data

(60) Provisional application No. 60/430,434, filed on Dec. 3, 2002.

(51) Int. Cl.
| | | |
|---|---|---|
| H04W 4/00 | (2009.01) | |
| G06F 1/03 | (2006.01) | |
| H04B 10/00 | (2013.01) | |
| H04B 10/2575 | (2013.01) | |
| H04W 16/26 | (2009.01) | |

(52) U.S. Cl.
CPC ......... *H04B 10/25759* (2013.01); *H04W 16/26* (2013.01); *H04B 10/25755* (2013.01)
USPC ........ 455/422.1; 455/232.1; 455/7; 455/11.1; 455/13.2; 342/58; 359/245; 398/116; 398/115

(58) Field of Classification Search
USPC ........ 455/422.1, 232.1, 7, 11.1, 13.2; 342/58; 398/11, 173, 180, 116, 115; 359/245
See application file for complete search history.

(56) References Cited

U.S. PATENT DOCUMENTS

| | | |
|---|---|---|
| 3,931,473 A | 1/1976 | Ferris, Jr. |
| 4,101,834 A | 7/1978 | Stutt et al. |
| 4,112,488 A | 9/1978 | Smith, III |
| 4,144,409 A | 3/1979 | Utano et al. |
| 4,144,411 A | 3/1979 | Frenkiel |
| 4,183,054 A | 1/1980 | Patisaul et al. |
| 4,231,116 A | 10/1980 | Sekiguchi et al. |
| 4,244,046 A | 1/1981 | Brouard et al. |
| 4,354,167 A | 10/1982 | Terreault et al. |

(Continued)

FOREIGN PATENT DOCUMENTS

| | | |
|---|---|---|
| CA | 2008900 | 10/1990 |
| CN | 1127056 | 7/1996 |

(Continued)

OTHER PUBLICATIONS

ADC Kentrox.COPYRGT. A Subsidiary of ADC Telecommunications, Inc. "And now a few words from your Customers . . . ", Aug. 1992 (4 pages).

(Continued)

*Primary Examiner* — Ariel Balaoing
(74) *Attorney, Agent, or Firm* — Fogg & Powers LLC

(57) ABSTRACT

An optical medium, such as fiber, is tapped to provide an antenna port wherever radio service coverage is desired. Each antenna port is a bi-directional remote unit that receives a digital optical signal from a host unit and transforms the signal to a radio frequency signal for transmission by the remote unit. The remote unit receives radio frequency signals that are converted to digital signals and summed with signals from other remote units and converted to an optical signal for transmission to the host unit.

24 Claims, 4 Drawing Sheets

(56) References Cited

U.S. PATENT DOCUMENTS

| | | |
|---|---|---|
| 4,402,076 A | 8/1983 | Krajewski |
| 4,451,699 A | 5/1984 | Gruenberg |
| 4,456,793 A | 6/1984 | Baker et al. |
| 4,475,010 A | 10/1984 | Huensch et al. |
| 4,485,486 A | 11/1984 | Webb et al. |
| 4,525,861 A | 6/1985 | Freeburg |
| 4,531,239 A | 7/1985 | Usui |
| 4,556,760 A | 12/1985 | Goldman |
| 4,596,051 A | 6/1986 | Feldman |
| 4,611,323 A | 9/1986 | Hessenmuller |
| 4,613,990 A | 9/1986 | Halpern |
| 4,628,501 A | 12/1986 | Loscoe |
| 4,654,843 A | 3/1987 | Roza et al. |
| 4,667,319 A | 5/1987 | Chum |
| 4,669,107 A | 5/1987 | Eriksson-Lennartsson |
| 4,691,292 A | 9/1987 | Rothweiler |
| 4,701,909 A | 10/1987 | Kavehrad et al. |
| 4,704,733 A | 11/1987 | Kawano |
| 4,718,004 A | 1/1988 | Dalal |
| 4,754,451 A | 6/1988 | Eng et al. |
| 4,759,000 A | 7/1988 | Reitz |
| 4,759,051 A | 7/1988 | Han |
| 4,759,057 A | 7/1988 | De Luca et al. |
| 4,760,573 A | 7/1988 | Calvignac et al. |
| 4,790,000 A | 12/1988 | Kinoshita |
| 4,797,947 A | 1/1989 | Labedz |
| 4,816,825 A | 3/1989 | Chan et al. |
| 4,831,662 A | 5/1989 | Kuhn |
| 4,849,963 A | 7/1989 | Kawano et al. |
| 4,868,862 A | 9/1989 | Ryoichi et al. |
| 4,881,082 A | 11/1989 | Graziano |
| 4,916,460 A | 4/1990 | Powell |
| 4,920,533 A | 4/1990 | Dufresne et al. |
| 4,932,049 A | 6/1990 | Lee |
| 4,977,593 A | 12/1990 | Ballance |
| 4,999,831 A | 3/1991 | Grace |
| 5,067,147 A | 11/1991 | Lee |
| 5,067,173 A | 11/1991 | Gordon et al. |
| 5,084,869 A | 1/1992 | Russell |
| 5,134,709 A | 7/1992 | Bi et al. |
| 5,136,410 A | 8/1992 | Heiling et al. |
| 5,138,440 A | 8/1992 | Radice |
| 5,159,479 A | 10/1992 | Takagi |
| 5,175,867 A | 12/1992 | Wejke et al. |
| 5,193,109 A | 3/1993 | Chien-Yeh Lee |
| 5,243,598 A | 9/1993 | Lee |
| 5,251,053 A | 10/1993 | Heidemann |
| 5,267,261 A | 11/1993 | Blakeney, II et al. |
| 5,272,700 A | 12/1993 | Hansen et al. |
| 5,278,690 A | 1/1994 | Vella-Coleiro |
| 5,280,472 A | 1/1994 | Gilhousen et al. |
| 5,285,469 A | 2/1994 | Vanderpool |
| 5,297,193 A | 3/1994 | Bouix et al. |
| 5,299,198 A | 3/1994 | Kay et al. |
| 5,301,056 A | 4/1994 | O'Neill |
| 5,303,287 A | 4/1994 | Laborde |
| 5,305,308 A | 4/1994 | English et al. |
| 5,309,474 A | 5/1994 | Gilhousen et al. |
| 5,313,461 A | 5/1994 | Ahl et al. |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,392,453 A | 2/1995 | Gudmundson et al. |
| 5,442,681 A | 8/1995 | Kotzin et al. |
| 5,442,700 A | 8/1995 | Snell et al. |
| 5,457,557 A * | 10/1995 | Zarem et al. ............... 398/116 |
| 5,499,047 A | 3/1996 | Terry et al. |
| 5,528,582 A | 6/1996 | Bodeep et al. |
| 5,552,920 A * | 9/1996 | Glynn ............... 398/126 |
| 5,586,121 A | 12/1996 | Moura et al. |
| 5,587,734 A | 12/1996 | Lauder et al. |
| 5,603,080 A | 2/1997 | Källander et al. |
| 5,621,786 A | 4/1997 | Fischer et al. |
| 5,627,879 A | 5/1997 | Russell et al. |
| 5,630,204 A | 5/1997 | Hylton et al. |
| 5,642,405 A | 6/1997 | Fischer et al. |
| 5,644,622 A | 7/1997 | Russell et al. |
| 5,657,374 A | 8/1997 | Russell et al. |
| 5,682,256 A | 10/1997 | Motley et al. |
| 5,708,961 A | 1/1998 | Hylton et al. |
| 5,715,235 A | 2/1998 | Sawahashi et al. |
| 5,724,385 A * | 3/1998 | Levin et al. ............... 375/146 |
| 5,765,097 A | 6/1998 | Dail |
| 5,765,099 A | 6/1998 | Georges et al. |
| 5,774,660 A | 6/1998 | Brendel et al. |
| 5,774,789 A | 6/1998 | Van der Kaay et al. |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,605 A | 9/1998 | Smith et al. |
| 5,852,651 A | 12/1998 | Fischer et al. |
| 5,878,325 A | 3/1999 | Dail |
| 5,946,622 A | 8/1999 | Bojeryd |
| 5,969,837 A | 10/1999 | Farber et al. |
| 5,978,650 A | 11/1999 | Fischer et al. |
| 6,005,884 A | 12/1999 | Cook et al. |
| 6,009,130 A * | 12/1999 | Lurey et al. ............... 375/347 |
| 6,061,089 A * | 5/2000 | Tonkin et al. ............... 348/211.6 |
| 6,112,086 A | 8/2000 | Wala |
| 6,122,529 A | 9/2000 | Sabat, Jr. et al. |
| 6,147,786 A | 11/2000 | Pan |
| 6,181,687 B1 | 1/2001 | Bisdikian |
| 6,192,216 B1 | 2/2001 |سabat, Jr. et al. |
| 6,198,558 B1 | 3/2001 | Graves et al. |
| 6,223,021 B1 | 4/2001 | Silvia et al. |
| 6,262,981 B1 | 7/2001 | Schmutz |
| 6,263,135 B1 * | 7/2001 | Wade ............... 385/37 |
| 6,275,990 B1 | 8/2001 | Dapper et al. |
| 6,317,884 B1 | 11/2001 | Eames et al. |
| 6,337,754 B1 * | 1/2002 | Imajo ............... 398/115 |
| 6,349,200 B1 | 2/2002 | Sabat, Jr. et al. |
| 6,356,374 B1 | 3/2002 | Farhan |
| 6,362,908 B1 | 3/2002 | Kimbrough et al. |
| 6,373,611 B1 | 4/2002 | Farhan et al. |
| 6,374,124 B1 | 4/2002 | Slabinski |
| 6,449,071 B1 | 9/2002 | Farhan et al. |
| 6,463,301 B1 * | 10/2002 | Bevan et al. ............... 455/562.1 |
| 6,466,572 B1 | 10/2002 | Ethridge et al. |
| 6,480,551 B1 | 11/2002 | Ohishi et al. |
| 6,486,907 B1 * | 11/2002 | Farber et al. ............... 725/78 |
| 6,697,603 B1 | 2/2004 | Lovinggood et al. |
| 6,704,545 B1 | 3/2004 | Wala |
| 6,738,581 B2 * | 5/2004 | Handelman ............... 398/79 |
| 6,751,417 B1 | 6/2004 | Combs et al. |
| 6,771,933 B1 | 8/2004 | Eng et al. |
| 6,785,558 B1 | 8/2004 | Stratford et al. |
| 6,801,767 B1 | 10/2004 | Schwartz et al. |
| 6,967,966 B1 | 11/2005 | Donohue |
| 6,980,831 B2 * | 12/2005 | Matsuyoshi et al. ............... 455/561 |
| 7,016,308 B1 | 3/2006 | Gallagher |
| 7,031,335 B1 | 4/2006 | Donohue et al. |
| 7,035,671 B2 | 4/2006 | Solum |
| 7,075,369 B2 | 7/2006 | Takenaka |
| 7,127,175 B2 * | 10/2006 | Mani et al. ............... 398/115 |
| 7,190,903 B1 | 3/2007 | Combs et al. |
| RE40,564 E | 11/2008 | Fischer et al. |
| 7,539,509 B2 | 5/2009 | Bauman et al. |
| 7,548,695 B2 | 6/2009 | Wake |
| 7,614,074 B2 | 11/2009 | Mobley et al. |
| 7,639,982 B2 | 12/2009 | Wala |
| 7,848,770 B2 | 12/2010 | Scheinert |
| 7,917,177 B2 | 3/2011 | Bauman |
| 8,019,221 B2 | 9/2011 | Zancewicz |
| 8,032,916 B2 | 10/2011 | Oyadomari et al. |
| 8,326,218 B2 | 12/2012 | Wala |
| RE43,964 E | 2/2013 | Fischer et al. |
| 8,577,286 B2 | 11/2013 | Wala |
| 2002/0003645 A1 * | 1/2002 | Kim et al. ............... 359/145 |
| 2003/0066087 A1 | 4/2003 | Sawyer et al. |
| 2003/0143947 A1 * | 7/2003 | Lyu ............... 455/7 |
| 2003/0162516 A1 | 8/2003 | Solum |
| 2005/0131645 A1 | 6/2005 | Panopoulos |

(56) References Cited

U.S. PATENT DOCUMENTS

| | | | |
|---|---|---|---|
| 2007/0166036 | A1 | 7/2007 | Combs et al. |
| 2009/0034979 | A1 | 2/2009 | Zancewicz |
| 2009/0067841 | A1 | 3/2009 | Combs et al. |
| 2010/0061291 | A1 | 3/2010 | Wala |
| 2011/0182583 | A1 | 7/2011 | Rakib |
| 2011/0265140 | A1 | 10/2011 | Rakib |
| 2014/0036758 | A1 | 2/2014 | Wala |

FOREIGN PATENT DOCUMENTS

| | | |
|---|---|---|
| DE | 3707244 | 9/1988 |
| EP | 0166885 A2 | 1/1986 |
| EP | 0346925 A2 | 12/1989 |
| EP | 0368673 A1 | 5/1990 |
| EP | 0391597 A2 | 10/1990 |
| EP | 0468688 A2 | 1/1992 |
| EP | 0664621 | 7/1995 |
| EP | 1303929 | 10/2011 |
| FR | 2345865 | 10/1977 |
| JP | 58-164007 | 9/1983 |
| JP | 3-26031 | 2/1991 |
| JP | 512374 | 1/1993 |
| WO | 9115927 | 10/1991 |
| WO | 0209319 | 1/2002 |
| WO | 2004051322 | 6/2004 |

OTHER PUBLICATIONS

ADC Kentrox, News Release, "ADC Kentrox Introduces Innovative Wireless Network Access Solution Cellular Subscribers Offered a New Level of Portable Services," Mar. 1, 1993 (3 pages).
ADC Kentrox, News Release, "First Field Trial Results Exceeds Expectations," Mar. 2, 1993 (2 pages).
ADC Kentrox Wireless System Group CityCell.TM. 824—A Positioning white paper, (Mar. 1993) CITA Trade Show.
ADC Kentrox Call Report, Oct. 18, 1992, call date Oct. 12, 1992, re: Bell Atlantic Mobile, Inc.
Akos et al., Jul. 1999, IEEE Transactions on Communications, 47:983-988, Direct Bandpass Sampling of Multiple Distinct RF Signals.
Ameritech, "Broadband Optical Transport Digital Microcell Connection Service—Interface and Performance Specifications. A technical descriptionof the User-Network Interface and Performance Specifications," AM TR-NIS 000117, (pp. 1-26), Issue 1, Dec. 1993.
Cellular Industry, The Day Group, "New Signal Transport Technology Digitizes the Cellular Band," 2 pages, (prior to Dec. 22, 2000).
Cox "A Radio System Proposal for Widespread Low-Power Tetherless Communications," IEEE Transactions on Communications, vol. 39(2), Feb. 1991, pp. 324-335.
Electronic Letters, an International Publication, Nov. 19, 1987, vol. 23 No. 24, pp. 1255-1257.
1998 Foxcom Wireless Proprietary Information, pp. 1-8, "Litenna In-Building RF Distribution System."
Gupta et al., "Land Mobile Radio Systems—A Tutorial Exposition", IEEE Communications Magazine, vol. 23(6), Jun. 1985, p. 37.
Ishio et al., "A Two-Way Wavelength-Division-Multiplexing Transmission and its Application to a Switched TV Distribution System," Electrical Communication Laboratories, Nipon Telegrah & Telephone Public Corporation, Yokosuka, Japan and Technical Bureau, Nippon Telegraph & Telephone Public Corporation, Tokyo, Japan, (10 pages) (prior to Dec. 22, 2000).
Kobb, "Personal Wireless," Special Report/Communications, IEEE Spectrum, Jun. 1993, pp. 20-25.
Lee et al., 1993 43rd IEEE Vehicular Technology Conference, May 18-20, 1993, Personal Communication—Freedom Through Wireless Technology, PacTel Corporation, published May 18, 1993, "Intelligent Microcell Applications in PCS," pp. 722-725.
Merrett et al., 41st IEEE Vehicular Technology Conference, May 19-22, 1991, Gateway to the Future Technology, 91CH2944-7, British Telecom Research Laboratories, "A Cordless Access System Using Radio-Over-Fibre Techniques," pp. 921-924.
Miicrowaves & RF, "Digital Transport for Cellular," Feb. 1993.
O'Byrne, Vehicular Technology Society 42nd VTS Conference Frontiers of Technology, From Pioneers to the 21st Century, GTE Laboratories Incorporated, "TDMA and CDMA in a Fiber-Optic Environment," vol. 2 of 2, pp. 727-731 (May 10, 1992).
Payne et al., "Single Mode Optical Local Networks", Globecom '85, IEEE Global Telecommunications Conference, Dec. 2-5, 1985, pp. 1201-1205.
Quinn, "The Cell Enhancer", Bell Atlanttic Mobile Systems, pp. 77-83.
Russell, New Microcell Technology Sets Cellular Carriers Free, Telephony, Mar. 1993, pp. 40, 42 and 46.
R. Steele. Towards a High-Capacity Digital Cellular Mobile Radio System. "Towards a High Capacity Digital Cellular Mobile Radio System," IEE Proceedings, vol. 132, Pt.F, No. 5, Aug. 1985, pp. 405-415.
Tang, Fiber Optic Antenna Remoting for Multi-Sector Cellular Cell Sites. GTE Laboratories—Abstract (Conference Jun. 14-18, 1992).
Titch, "Kentrox boosts coverage and capacity," Telephony Jan. 25, 1993 (1 page).
Urban Microcell System Layout. GTE Laboratories (Conference Jun. 14-18, 1992).
Wala, 1993 43rd IEEE Vehicular Technology Conference, May 18-20, 1993, Personal Communication—Freedom Through Wireless Technology, Waseca Technology Inc., published May 18, 1993, "A New Microcell Freedom Architecture Using Digital Optical Transport," pp. 585-588.
"ZoneMaster.TM.—Maximum Coverage for High-Capacity Locations". Decibel Multi Media MicroCELL System. 4 pages 1993 Decibel Products. 2-83-5M.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", , pp. 1171-1175, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
China Patent Office, "Notice of Grant of Patent Right for Invention from CN Application No. 01815499.9 mailed Oct. 24, 2008", "from Foreign Counterpart of U.S. Appl. No. 09/619,431", Oct. 24, 2008, pp. 1-4, Published in: CN.
Chinese Patent Office, "First Office Action from CN Application No. 01815499.9 mailed Jul. 8, 2005", "from Foreign Counterpart of U.S. Appl. No. 09/619,431", Jul. 8, 2005, pp. 1-8, Published in: CN.
Chinese Patent Office, "Second Office Action from CN Application No. 01815499.9 mailed May 11, 2007", "from Foreign Counterpart of U.S. Appl. No. 09/619,431", May 11, 2007, pp. 1-5, Published in: CN.
Chinese Patent Office, "Third Office Action from CN Application No. 01815499.9 mailed Oct. 26, 2007", "from Foreign Counterpart of U.S. Appl. No. 09/619,431", Oct. 26, 2007, pp. 1-8, Published in: CN.
Chinese Patent Office, "Fourth Office Action from CN Application No. 01815499.9 mailed Mar. 7, 2007", "from Foreign Counterpart of U.S. Appl. No. 09/619,431", Mar. 7, 2007, pp. 1-8, Published in: CN.
Chinese Patent Office, "Notification to Grant Patent Right for Invention from CN Application No. 200710153587.X mailed May 28, 2013", "from Foreign Counterpart of U.S. Appl. No. 09/619,431", May 28, 2013, pp. 1-3, Published in: CN.
Chinese Patent Office, "Second Office Action from CN Application No. 200710153587.X mailed Feb. 4, 2013", "from Foreign Counterpart of U.S. Appl. No. 09/619,431", Feb. 4, 2013, pp. 1-7, Published in: CN.
Chinese Patent Office, "First Office Action from CN Application No. 200710153587.X mailed Mar. 19, 2010", "from Foreign Counterpart of U.S. Appl. No. 09/619,431", Mar. 19, 2010, pp. 1-12, Published in: CN.

(56) References Cited

OTHER PUBLICATIONS

Chinese Patent Office, "Decision on Rejection from CN Application No. 200710153587.X mailed Nov. 2, 2010", "from Foreign Counterpart of U.S. Appl. No. 09/619,431", Nov. 2, 2010, pp. 1-9, Published in: CN.
Chinese Patent Office, "Notice of Reexamination from CN Application No. 200710153587.X mailed Jun. 21, 2012", "from Foreign Counterpart of U.S. Appl. No. 09/619,431", Jun. 21, 2012, pp. 1-18, Published in: CN.
Chinese Patent Office, "Second Office Action from CN Application No. 200910005002.9 mailed Jan. 23, 2013", "from Foreign Counterpart of U.S. Appl. No. 09/619,431", Jan. 23, 2013, pp. 1-11, Published in: CN.
China Patent Office, "Notification to Grant Patent Right for Invention from CN Application No. 200910005002.9 mailed Aug. 19, 2013", Aug. 19, 2013, pp. 1-6, Published in: CN.
Chinese Patent Office, "First Office Action from CN Application No. 200910005002.9 mailed Apr. 6, 2012", "from Foreign Counterpart of U.S. Appl. No. 09/619,431", Apr. 6, 2012, pp. 1-12, Published in: CN.
European Patent Office, "Communication under Rule 71(3) EPC from EPO Application No. 01950794.6-2411 mailed May 3, 2011", "from Foreign Counterpart of U.S. Appl. No. 09/619,431", May 3, 2011, pp. 1-45, Published in: EP.
European Patent Office, "Office Action from EPO Application No. 01950794.6-2411 mailed Feb. 24, 2006", "from Foreign Counterpart of U.S. Appl. No. 09/619,431", Feb. 24, 2006, pp. 1-5, Published in: EP.
European Patent Office, "Office Action from EPO Application No. 01950794.6-2411 mailed Mar. 6, 2007", "from Foreign Counterpart of U.S. Appl. No. 09/619,431", Mar. 6, 2007, pp. 1-4, Published in: EP.
European Patent Office, "Office Action from EPO Application No. 01950794.6-2411 mailed Nov. 16, 2010", "from Foreign Counterpart of U.S. Appl. No. 09/619,431", Nov. 16, 2010, pp. 1-4, Published in: EP.
European Patent Office, "Summons to Attend Oral Proceedings from EPO Application No. 01950794.6-2411 mailed May 21, 2010", "from Foreign Counterpart of U.S. Appl. No. 09/619,431", May 21, 2010, pp. 1-6, Published in: EP.
European Patent Office, "Extended European Search Report from EPO Application No. 10011450.3-2411 mailed Jan. 14, 2011", "from Foreign Counterpart of U.S. Appl. No. 09/619,431", Jan. 14, 2011, pp. 1-9, Published in: EP.
U.S. Patent Office, "Notice of Allowance", "U.S. Appl. No. 09/619,431", Aug. 12, 2003, pp. 1-9.
U.S. Patent and Trademark Office, "Office Action", "U.S. Appl. No. 09/619,431", Mar. 13, 2003, pp. 1-15.
U.S. Patent and Trademark Office, "Final Office Action", "U.S. Appl. No. 10/740,944", Apr. 25, 2007, pp. 1-19.
U.S. Patent and Trademark Office, "Final Office Action", "U.S. Appl. No. 10/740,944", Jul. 18, 2007, pp. 1-21.
U.S. Patent and Trademark Office, "Final Office Action", "U.S. Appl. No. 10/740,944", Oct. 3, 2007, pp. 1-22.
U.S. Patent and Trademark Office, "Final Office Action", "U.S. Appl. No. 10/740,944", Oct. 14, 2008, pp. 1-25.
U.S. Patent and Trademark Office, "Notice of Allowance", "U.S. Appl. No. 10/740,944", Aug. 13, 2009, pp. 1-12.
U.S. Patent and Trademark Office, "Office Action", "U.S. Appl. No. 10/740,944", Aug. 24, 2006, pp. 1-19.
U.S. Patent and Trademark Office, "Final Office Action", "U.S. Appl. No. 10/740,944", Feb. 5, 2007, pp. 1-16.
U.S. Patent and Trademark Office, "Office Action", "U.S. Appl. No. 10/740,944", Apr. 3, 2008.
U.S. Patent and Trademark Office, "Office Action", "U.S. Appl. No. 10/740,944", Feb. 27, 2009, pp. 1-25.
U.S. Patent and Trademark Office, "Notice of Allowance", "U.S. Appl. No. 12/617,215", Aug. 2, 2012, pp. 1-11.
U.S. Patent and Trademark Office, "Office Action", "U.S. Appl. No. 12/617,215", Apr. 11, 2012, pp. 1-12.
U.S. Patent and Trademark Office, "Notice of Allowance and Fees Due", "from U.S. Appl. No. 13/662,948", Jul. 3, 2013, pp. 1-10, Published in: US.
U.S. Patent and Trademark Office, "Office Action", "from U.S. Appl. No. 13/662,948", Apr. 24, 2013, pp. 1-23, Published in: US.
The International Bureau of WIPO, "International Preliminary Examination Report from PCT Application No. PCT/US 01/21021 mailed Jun. 10, 2002", "from PCT Counterpart of U.S. Appl. No. 09/619,431", Jun. 10, 2002, pp. 1-3, Published in: WO.
International Searching Authority, "International Search Report from PCT Application No. PCT/US 01/21021 mailed Nov. 15, 2001", "from Foreign Counterpart of U.S. Appl. No. 09/619,431", Nov. 15, 2001, pp. 1-7, Published in: WO.
The International Bureau of WIPO, "Written Opinion from PCT Application No. PCT/US 01/21021 mailed Mar. 18, 2002", "from Foreign Counterpart of U.S. Appl. No. 09/619,431", Mar. 18, 2002, pp. 1-2, Published in: WO.
China Patent Office, "Notice of Grant of Patent Right for Invention from CN Application No. 94192782.2 mailed Sep. 29, 2000", "from Foreign Counterpart of U.S. Appl. No. 08/204,660", Sep. 29, 2000, pp. 1-4, Published in: CN.
Japan Patent Office, "Office Action from JP Application No. 6-525837 mailed Oct. 14, 2003", "from foreign counterpart of U.S. Appl. No. 08/204,660", Oct. 14, 2003, pp. 1-2, Published in: JP.
U.S. Patent and Trademark Office, "Final Office Action", "U.S. Appl. No. 08/204,660", Jun. 12, 1996, pp. 1-8, Published in: US.
U.S. Patent and Trademark Office, "Notice of Allowance", "U.S. Appl. No. 08/204,660", Oct. 2, 1996, pp. 1-4, Published in: US.
U.S. Patent and Trademark Office, "Office Action", "U.S. Appl. No. 08/204,660", Apr. 4, 1995, pp. 1-14, Published in: US.
U.S. Patent and Trademark Office, "Office Action", "U.S. Appl. No. 08/204,660", Oct. 26, 1995, pp. 1-8, Published in: US.
U.S. Patent and Trademark Office, "Office Action", "U.S. Appl. No. 08/299,159", Feb. 1-9, 1997, pp. 1-9, Published in: US.
U.S. Patent and Trademark Office, "Restriction Requirement", "U.S. Appl. No. 08/204,660", Mar. 10, 1995, pp. 1-13, Published in: US.
U.S. Patent and Trademark Office, "Notice of Intent to Issue a Reexam Certificate", "U.S. Appl. No. 90/010,357", Jun. 22, 2010, pp. 1-18, Published in: US.
U.S. Patent and Trademark Office, "Order Granting/Denying Request for Ex Parte Reexamination", "U.S. Appl. No. 90/010,357", Mar. 12, 2009, pp. 1-10, Published in: US.
U.S. Patent and Trademark Office, "Office Action", "U.S. Appl. No. 90/010,357", Sep. 25, 2009, pp. 1-17, Published in: US.
U.S. Patent and Trademark Office, "Office Action", "U.S. Appl. No. 08/294,742", May 27, 1996, pp. 1-5, Published in: US.
U.S. Patent and Trademark Office, "Office Action", "U.S. Appl. No. 08/294,742", Oct. 26, 1996, pp. 1-4, Published in: US.
U.S. Patent and Trademark Office, "Office Action", "U.S. Appl. No. 08/298,652", May 29, 1995, pp. 1-7, Published in: US.
U.S. Patent and Trademark Office, "Notice of Allowance", "U.S. Appl. No. 08/299,159", Aug. 19, 1997, pp. 1-9, Published in: US.
U.S. Patent and Trademark Office, "Office Action", "U.S. Appl. No. 08/299,159", Jul. 17, 1995, pp. 1-5, Published in: US.
U.S. Patent and Trademark Office, "Office Action", "U.S. Appl. No. 08/299,159", Apr. 9, 1996, pp. 1-3, Published in: US.
U.S. Patent and Trademark Office, "Office Action", "U.S. Appl. No. 08/299,159", Oct. 2, 1996, pp. 1-2, Published in: US.
U.S. Patent and Trademark Office, "Office Action", "U.S. Appl. No. 08/299,159", Feb. 19, 1997, pp. 1-9, Published in: US.
U.S. Patent and Trademark Office, "Notice of Allowance", "U.S. Appl. No. 08/410,129", Oct. 17, 1996, pp. 1-6, Published in: US.
U.S. Patent and Trademark Office, "Office Action", "U.S. Appl. No. 08/410,129", Jan. 23, 1996, pp. 1-12, Published in: US.
U.S. Patent and Trademark Office, "Notice of Intent to Issue a Reexam Certificate", "U.S. Appl. No. 90/010,362", Jun. 22, 2010, pp. 1-16, Published in: US.
U.S. Patent and Trademark Office, "Order Granting/Denying Request for Ex Parte Reexamination", "U.S. Appl. No. 90/010,362", Apr. 17, 2009, pp. 1-8, Published in: US.
U.S. Patent and Trademark Office, "Office Action", "U.S. Appl. No. 90/010,362", Sep. 25, 2009, pp. 1-18, Published in: US.

(56) References Cited

OTHER PUBLICATIONS

U.S. Patent and Trademark Office, "Notice of Allowance", "U.S. Appl. No. 09/747,273", Aug. 8, 2007, pp. 1-8.
U.S. Patent and Trademark Office, "Office Action", "U.S. Appl. No. 09/747,273", Mar. 30, 2004, pp. 1-19.
U.S. Patent and Trademark Office, "Office Action", "U.S. Appl. No. 09/747,273", Oct. 6, 2005, pp. 1-10.
U.S. Patent and Trademark Office, "Final Office Action", "U.S. Appl. No. 90/010,363", Jun. 23, 2010, pp. 1-21, Published in: US.
U.S. Patent and Trademark Office, "Notice of Intent to Issue a Reexam Certificate", "U.S. Appl. No. 90/010,363", Dec. 6, 2010, pp. 1-21, Published in: US.
U.S. Patent and Trademark Office, "Order Granting/Denying Request for Ex Parte Reexamination", "U.S. Appl. No. 09/010,363", Apr. 17, 2009, pp. 1-10, Published in: US.
U.S. Patent and Trademark Office, "Office Action", "U.S. Appl. No. 90/010,363", Sep. 25, 2009, pp. 1-32, Published in: US.
U.S. Patent and Trademark Office, "Advisory Action", "U.S. Appl. No. 11/937,255", Nov. 3, 2011, pp. 1-2.
U.S. Patent and Trademark Office, "Final Office Action", "U.S. Appl. No. 11/937,255", Aug. 29, 2011, pp. 1-14.
U.S. Patent and Trademark Office, "Notice of Allowance", "U.S. Appl. No. 11/937,255", Sep. 17, 2012, pp. 1-11.
U.S. Patent and Trademark Office, "Office Action", "U.S. Appl. No. 11/937,255", Feb. 17, 2011, pp. 1-13.
U.S. Patent and Trademark Office, "Office Action", "U.S. Appl. No. 13/725,866", Jan. 22, 2014, pp. 1-28, Published in: US.
U.S. Patent and Trademark Office, "Restriction Requirement", "U.S. Appl. No. 13/725,866", Sep. 10, 2013, pp. 1-8, Published in: US.
The International Bureau of WIPO, "International Preliminary Report on Patentability from PCT Application No. PCT/US 94/05897 mailed May 29, 1995", May 29, 1995, pp. 1-8, Publisher: from PCT Counterpart of U.S. Appl. No. 08/204,660, Published in: WO.
The International Bureau of WIPO, "International Search Report from PCT Application No. PCT/US 94/05897 mailed Oct. 31, 1994", "from PCT Counterpart of U.S. Appl. No. 08/204,660", Oct. 31, 1994, pp. 1-7, Published in: WO.
The International Bureau of WIPO, "Written Opinion from PCT Application No. PCT/US 94/05897 mailed Feb. 14, 1995", "from PCT Counterpart to U.S. Appl. No. 08/204,660", Feb. 14, 1995, pp. 1-7, Published in: WO.
China Patent Office, "Notification of Grant Patent Right for Invention from CN Application No. 200380109396.3 mailed Jun. 29, 2010", "from Chinese Counterpart of U.S. Appl. No. 10/395,743", Jun. 29, 2010, pp. 1-4, Published in: CN.
China Patent Office, "First Office Action from CN Application No. 200380109396.3 mailed Jan. 4, 2008", "from Chinese Counterpart of U.S. Appl. No. 10/395,743", Jan. 4, 2008, pp. 1-7, Published in: CN.
European Patent Office, "Office Action from EPO Application No. 03790242.6-2415 mailed Jul. 24, 2007", "from European Counterpart of U.S. Appl. No. 10/395,743", Jul. 24, 2007, pp. 1-4, Published in: EP.
European Patent Office, "Office Action from EPO Application No. 03790242.6-2415 mailed Feb. 11, 2009", "from European Counterpart of U.S. Appl. No. 10/395,743", Feb. 11, 2009, pp. 1-4, Published in: EP.
Korean Patent Office, "Decision to Grant from KR Application No. 2005-7010190 mailed Feb. 2, 2012", "from Foreign Counterpart to U.S. Appl. No. 10/395,743", Feb. 2, 2012, pp. 1-7, Published in: KR.
Korean Patent Office, "Office Action from KR Application No. 2005-7010190 mailed Sep. 30, 2010", "from Foreign Counterpart to U.S. Appl. No. 10/395,743", Sep. 30, 2010, pp. 1-5, Published in: KR.
Korean Patent Office, "Final Rejection from KR Application No. 2005-7010190 mailed Oct. 31, 2011", "from Korean Counterpart to U.S. Appl. No. 10/395,743", Oct. 31, 2011, pp. 1-3, Published in: KR.
The International Bureau of WIPO, "International Preliminary Report on Patentability from PCT Application No. PCT/US03/38302 mailed Dec. 14, 2011", "from PCT Counterpart of U.S. Appl. No. 10/395,743", Dec. 14, 2011, pp. 1-10, Published in: WO.
The International Bureau of WIPO, "International Search Report from PCT Application No. PCT/US03/38302 mailed May 2, 2005", "from PCT Counterpart of U.S. Appl. No. 10/395,743", May 2, 2005, pp. 1-5, Published in: WO.
Foxcom Wireless Proprietary Information, "Application Note RFIBER-RF Fiberoptic Links for Wireless Applications", 1998, pp. 3-11.
City Cell, Cellular Industry the Day Group, "ADC Kentrox Citycell Field Trial Yields Another First—Simultaneous Analog and Digital Calls", prior to Dec. 22, 2000, p. 1.
Ericksson, "Advertisement by Erickssson", "Telephony", 1994, p. 1.
"ADC Kentrox Introduces Citycell 824, A Replacement for Conventional Cell Sites; Company's Original Goal Was to Improve F", "Telocator Bulletin", Feb. 1993, p. 1.
Foxcom Wireless Properietary Information, "Litenna In-Building RF Distribution System", 1998, pp. 1-8.
Horowitz, Paul, "Digital Electronics", "The Art of Electronics", 1980, p. 316, Publisher: Press Syndicte of the University of Cambridge.
Schneiderman, "Offshore Markets Gain in Size, Competitiveness Even the Smallest Industry Companies Are Expanding Their Global Buisness", "Microwaves and RF", Mar. 1993, pp. 33-39, vol. 32, No. 3, Publisher: Penton Publishing, Inc, Published in: Berea, OH.
Nakatsugawa et al., "Software Radio Base and Personal Stations for Cellular/PCS Systems", 2000, pp. 617-621, Publisher: IEEE.
European Patent Office, "Communication Under Rule 71(3) EPC from EPO Application No. 03790242.6-2415 mailed May 14, 2013", "from European Counterpart of U.S. Appl. No. 10/395,743", May 15, 2013, pp. 1-27, Published in: EP.

\* cited by examiner

DISTRIBUTED DIGITAL ANTENNA SYSTEM

RELATED APPLICATION

This application claims priority to U.S. Provisional Patent Application Ser. No. 60/430,434 filed Dec. 3, 2002, and titled "Distributed Digital Antenna System," which is commonly assigned and incorporated by reference herein.

TECHNICAL FIELD

The present invention relates generally to communications and particularly to communications through a distributed antenna system.

BACKGROUND

Various types of wireless communication systems have become prevalent around the world. For example, cellular communication systems cover most major metropolitan areas as well as major highways through remote areas. Cellular systems permit individuals with cellular handsets to communicate with base stations that are connected to the public switched telephone network (PSTN) or some other communication network.

As with any communication system, cellular systems can leave coverage "holes" where the signal from the base stations cannot reach. The holes can be in tunnels, valleys, city streets between tall buildings, or any other location where a radio frequency (RF) signal is blocked.

Placing additional base stations where these coverage holes are located is not always an option. Base stations tend to be very expensive due not only to the cost of the equipment but also because of land acquisition costs. Additionally, large base station antennas may not fit within an area either physically or aesthetically.

One solution to hole coverage is to use smaller remote antennas where coverage is needed but a base station is not warranted or desired. One problem with remote antennas, however, is that coaxial cable cannot be run long distances due to attenuation. Remote antennas are difficult to install along a highway or through a tunnel due to this attenuation problem. Using repeaters may not be an option since this only adds to the expense and complexity of the system. There is a resulting need in the art for a distributed antenna system that does not suffer from attenuation problems.

SUMMARY OF THE INVENTION

The embodiments of the present invention encompass a distributed digital antenna system that has a host unit for converting radio frequency signals to digital optical signals and digital optical signals to radio frequency signals. The digital optical signals are transmitted over an optical medium to a plurality of remote units that are daisy-chained along the optical medium. Each remote unit transmits an analog representation of the digital optical signals from the host unit and receives radio frequency signals that are converted by the remote unit to digital optical signals for use by the host unit.

DETAILED DESCRIPTION OF THE PREFERRED EMBODIMENT

The embodiments of the present invention provide a digital distributed antenna system that enables a communication system to fill coverage holes without the expense of additional base stations. This is accomplished by distributing a fiber optic cable through the area in which coverage is desired and tapping into the fiber at desired antenna locations.

The embodiments of the present invention refer to fiber optics as a means of communication between remote units and the host unit. However, any optical medium, such as a laser through the air, can be substituted for the optical fiber.

Figure 1:
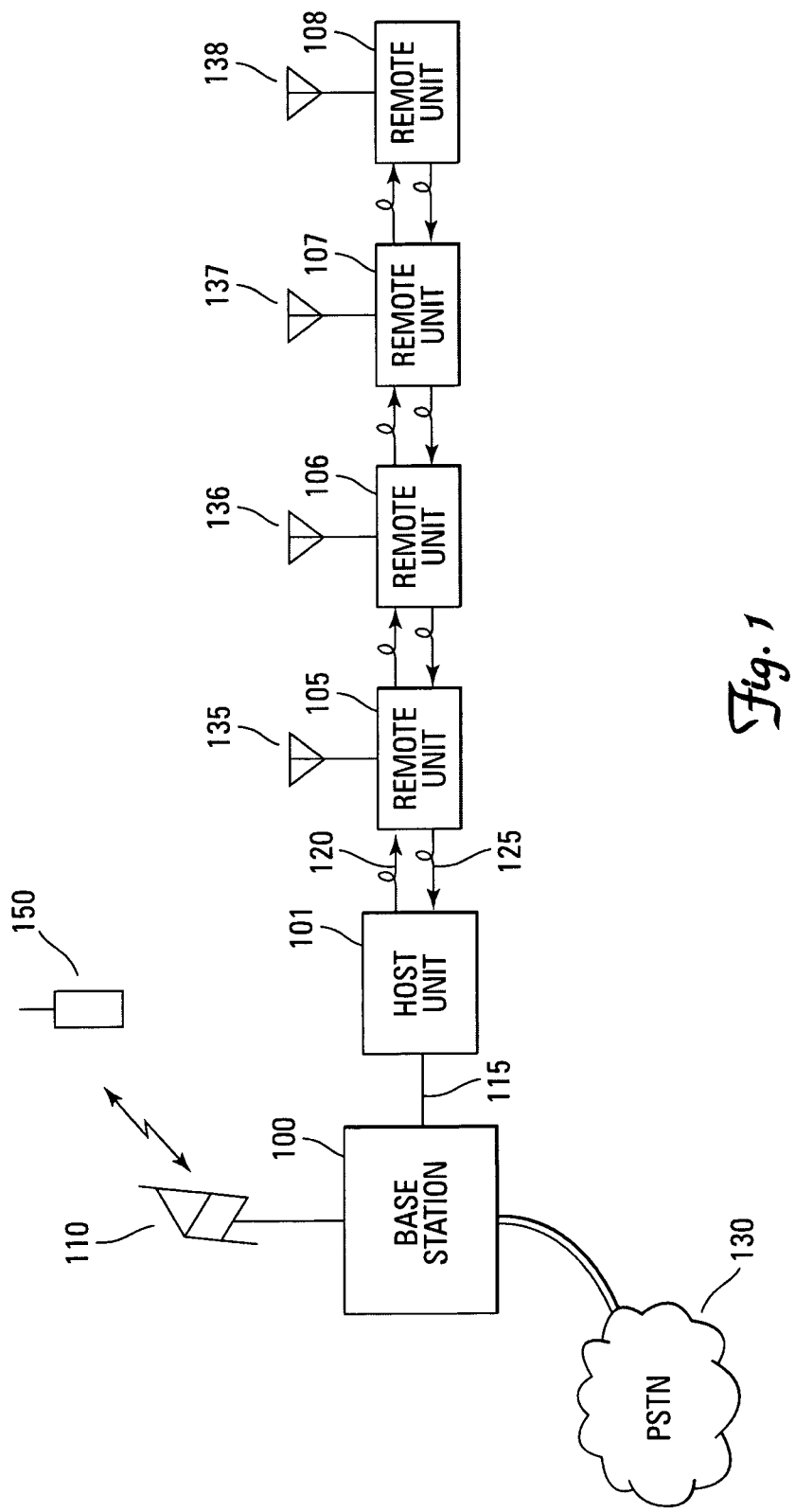
FIG. 1 shows a block diagram of one embodiment of a distributed digital antenna system of the present invention.

FIG. 1 illustrates a block diagram of one embodiment of a distributed digital antenna system of the present invention. The system has a base station (100) that communicates over an RF link using an antenna (110). The base station communicates over the RF link using any appropriate air interface standard. For example, the air interface standard comprises one of Advanced Mobile Phone System (AMPS), code division multiple access (CDMA), time division multiple access (TDMA), or Global System for Mobile communications (GSM) or any other appropriate air interface standard.

The RF link is made up of a forward link over which the base station (100) transmits to a subscriber unit wireless terminal (150). The subscriber unit (150) transmits back to the base station (100) over a reverse link. The subscriber unit (150) is either a mobile station or a fixed station such as in a wireless local loop system.

The base station (100) has the transmitters and receivers that enable the subscriber unit (150) to communicate with the public switched telephone network (PSTN) (130). In one embodiment, the base station also links the subscriber unit (150) to other subscriber units that are communicating with other base stations. In one embodiment, the base station (100) is connected to the PSTN through a mobile switching center that handles the switching of calls with multiple base stations.

A host unit (101) is connected to the base station (100) through an RF link (115). In one embodiment, this link (115) is a coaxial cable. Other embodiments use other types of connections such as an air interface or an optical fiber carrying digital RF signals. U.S. patent application Ser. No. 09/619,431, assigned to ADC Telecommunications, Inc. and incorporated herein by reference, discusses digital RF signals.

The host unit (101) is responsible for converting the RF signal from the base station (100) to an optical signal for transmission over an optical medium. The host unit (101) also converts a received optical signal to an RF signal for transmission to the base station (100). In other embodiments, the host unit (101) performs additional functions.

One or more remote units (105-108) are connected to the host unit (101) through an optical medium, such as fiber optic lines (120 and 125), in a daisy-chain arrangement. The remote units (105-108) are placed in locations that require additional signal coverage due to a lack of coverage by the base station (100). The remote units (105-108) communicate with subscriber units in a particular remote unit's coverage area over an RF link provided by the remote unit antennas (135-138).

For purposes of illustration, four remote units (105-108) are shown. However, alternate embodiments use other quantities of remote units. If only a small geographic area requires coverage, as few as one remote unit (105) is used. If a highway in a remote area requires additional coverage, more than four remote units are typically used.

The embodiment of FIG. 1 uses a separate fiber optic line for each direction of communication. Each fiber carries a different wavelength. For example, the fiber optic line (120) from the host unit (101) to the remote units (105-108) carries a wavelength of $\lambda_1$. The fiber optic line (125) from the remote units (105-108) to the host unit (101) carries a wavelength of $\lambda_2$. In alternate embodiments, each fiber carries the same wavelength.

The fiber optic line (120) from the host unit (101) to the remote units (105-108) carries the digital optical signal for transmission by the (105-108). The fiber optic line (125) from the remote units (105-108) carries a digital optical signal comprising the sum of the received signals from each of the remote units (105-108). The generation of this summation signal from the remote units is discussed subsequently.

Figure 2:
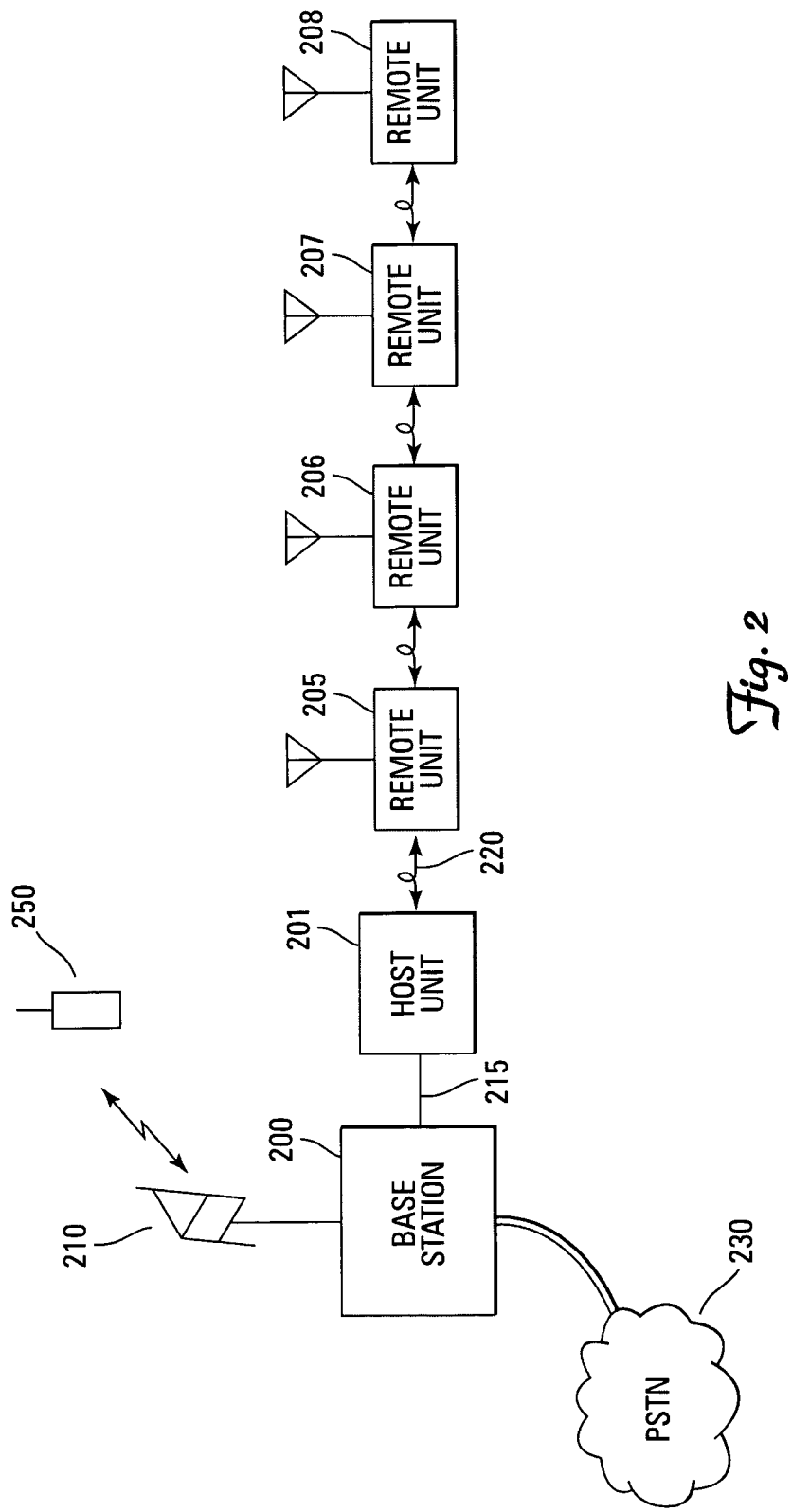
FIG. 2 shows a block diagram of another embodiment of a distributed digital antenna system of the present invention.

FIG. 2 illustrates a block diagram of another embodiment of a distributed digital antenna system of the present invention. This system is similar to the embodiment of FIG. 1 except that the remote units (205-208) are connected to the host unit (201) over a single optical medium (220).

The system of FIG. 2 has a base station (200) that communicates over an RF link using an antenna (210). The base station can communicate over the RF link using any air interface standard. For example, the air interface standard may be code division multiple access (CDMA), time division multiple access (TDMA), or Global System for Mobile communications (GSM).

The RF link is made up of a forward link over which the base station (200) transmits to a subscriber unit (250). The subscriber unit (250) transmits back to the base station (200) over a reverse link. The subscriber unit (250) may be a mobile station or a fixed station such as in a wireless local loop system.

The base station (200) has the transmitters and receivers that enable the subscriber unit (250) to communicate with the public switched telephone network (PSTN) (230). The base station may also link the subscriber unit (250) to other subscriber units that are communicating with other base stations. In one embodiment, the base station (200) is connected to the PSTN through a mobile switching center that handles the switching of calls with multiple base stations.

A host unit (201) is connected to the base station (200) through an RF link (215). In one embodiment, this link (215) is a coaxial cable. Other embodiments use other types of connections such as an air interface or an optical fiber carrying digital RF signals.

The host unit (201) is responsible for converting the RF signal from the base station (200) to a digital optical signal for transmission over an optical medium. The host unit (201) also converts a received optical signal to an RF signal for transmission to the base station (200). In other embodiments, the host unit (201) performs additional functions.

One or more remote units (205-208) are connected to the host unit (201) through an optical medium, such as a fiber optic line (220), that is connected in a daisy-chain arrangement. The remote units (205-208) are placed in locations that require additional signal coverage due to a lack of coverage by the base station (200).

For purposes of illustration, four remote units (205-208) are shown. However, alternate embodiments use other quantities of remote units.

The embodiment of FIG. 2 uses a single fiber optic line (220) for communication both to and from the remote units (205-208). This is accomplished by the single fiber (220) carrying multiple wavelengths. For example, the fiber optic line (220) uses a wavelength of $\lambda_1$ for the digital signal from the host unit to the remote units (205-208). The fiber optic line (220) also carries a digital summation signal with a wavelength of $\lambda_2$. This digital summation signal is the sum of the received signals from the remote units (205-208). The generation of this summation signal from the remote units is discussed subsequently.

Figure 3:
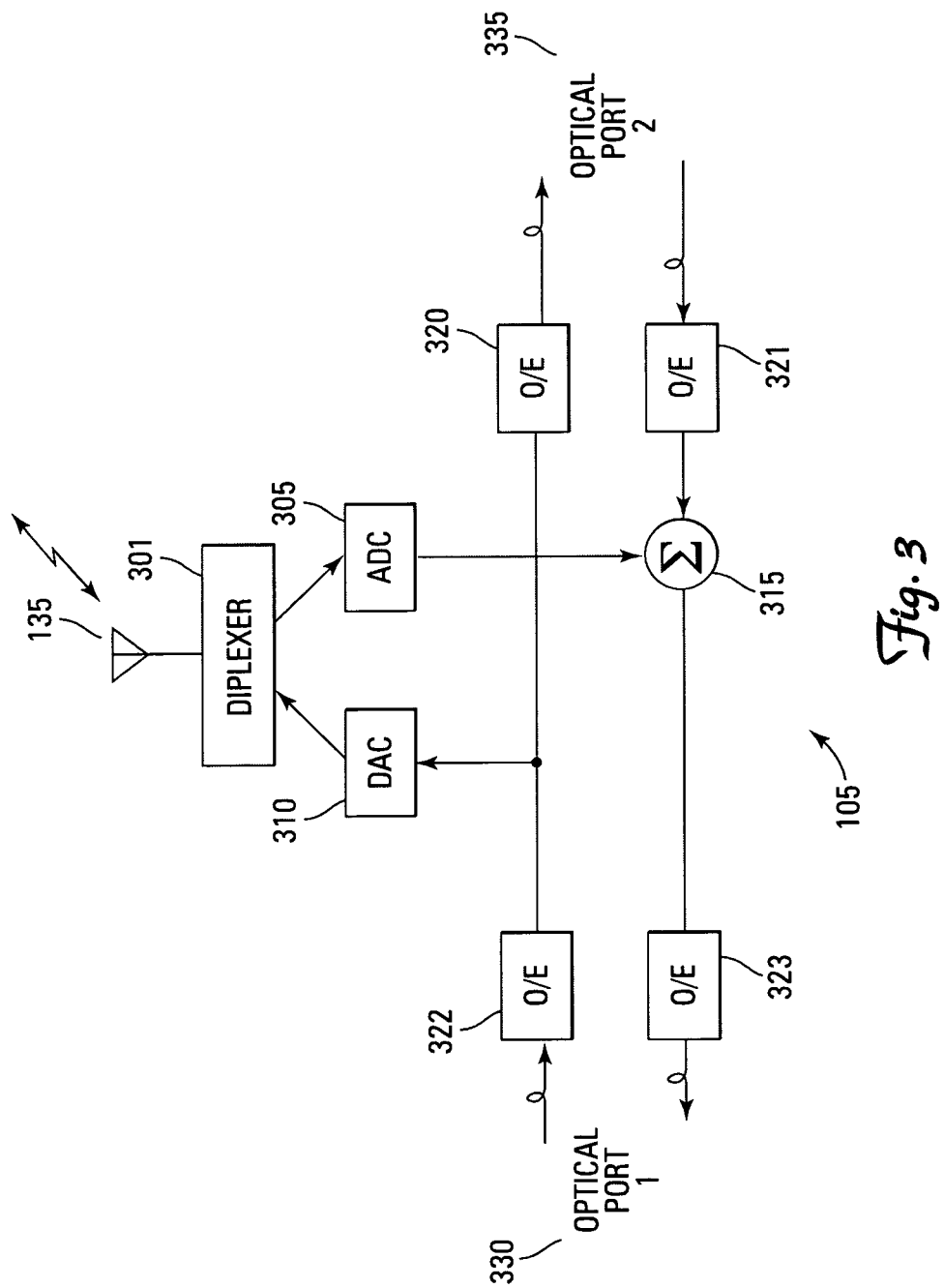
FIG. 3 shows a block diagram of one embodiment of a remote unit in accordance with the system of FIG. 1.

FIG. 3 illustrates a block diagram of one embodiment of a remote unit (105) of FIG. 1. Each of the remote units (105-108) of the embodiment of FIG. 1 are substantially identical in functional composition.

The remote unit (105) transmits and receives RF signals over the antenna (135). Both the receive and transmit circuitry is connected to the antenna (135) through a diplexer (301).

Alternate embodiments use other quantities of antennas. For example, one embodiment uses three antennas to cover three different sectors of an area.

An analog signal that is received on the antenna (135) is split off by the diplexer (301) to an analog-to-digital converter (305). The analog-to-digital converter (305) digitizes the received analog signal by periodically sampling the signal. The sampling generates a digital representation of the received analog signal.

The digitized received signal is input to a summer (315) to be added to the digitized signals from the preceding remote units in the daisy-chain. The input of the summer (315), therefore, is coupled to an output of a previous remote unit. The output of the summer (315) is a summation signal that is coupled to either the input of a subsequent remote unit or to the host unit. The host unit thus receives a summation signal that represents the sum of all the signals received by the remote units (105-108) of the system.

A digital signal from the host unit is coupled to a digital-to-analog converter (310). The digital-to-analog converter (310) takes the digital representation of an analog signal and converts it to the analog signal for transmission by the antenna (135).

Optical-to-Electrical converters (320-323) are located at the optical ports (330 and 335) of the remote unit (105). Each optical port (330 and 335) has an input and an output that are each coupled to an Optical-to-Electrical converter (320-323). Since the remote unit (105) operates with electrical signals that are represented by the optical signals coming in through the optical ports (330 and 335), the Optical-to-Electrical converters (320-323) are responsible for converting the optical signals to electrical signals for processing by the remote unit (105). The Optical-to-Electrical converters (320-323) are also responsible for converting received electrical signals from electrical to an optical representation for transmission over the optical fiber.

Figure 4:
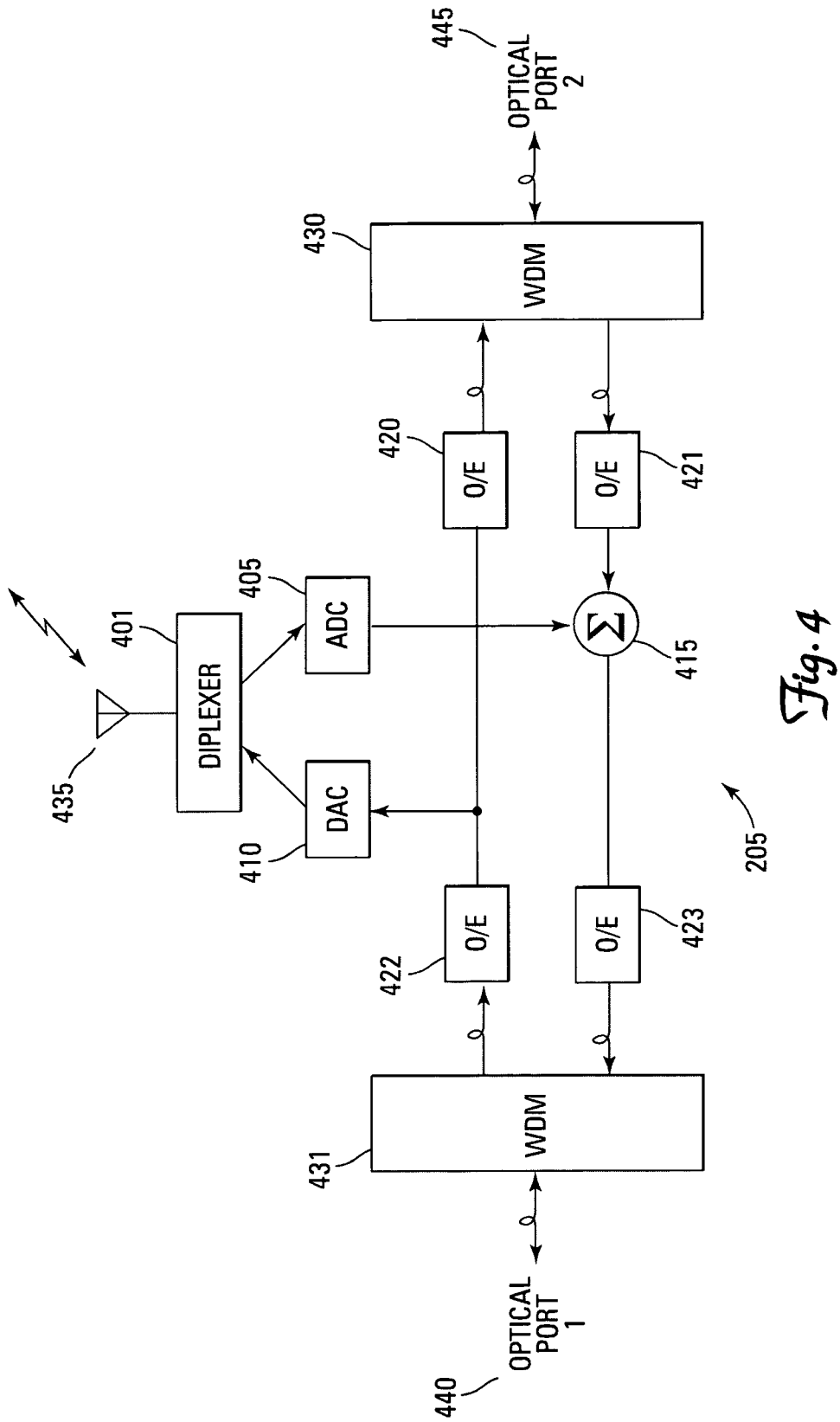
FIG. 4 shows a block diagram of one embodiment of a remote unit in accordance with the system of FIG. 2.

FIG. 4 illustrates a block diagram of one embodiment of a remote unit (205) of FIG. 2. Each of the remote units (205-208) of the embodiment of FIG. 1 is substantially identical in functional composition.

The remote unit (205) transmits and receives RF signals over the antenna (435). Both the receive and transmit circuitry are connected to the antenna (435) through a diplexer (401).

Alternate embodiments use other quantities of antennas. For example, one embodiment uses three antennas to cover three sectors of an area.

An analog signal that is received on the antenna (435) is split off by the diplexer (401) to an analog-to-digital converter (405). The analog-to-digital converter (405) digitizes the received analog signal by periodically sampling the signal. The sampling generates a digital representation of the received analog signal.

The digitized received signal is input to a summer (415) to be added to the digitized signals from the preceding remote units in the daisy-chain. The host unit thus receives a summation signal that represents the sum of all the signals received by the remote units (205-208) of the system.

A digital signal from the host unit is coupled to a digital-to-analog converter (410). The digital-to-analog converter (410) takes the digital representation of an analog signal and converts it to the analog signal for transmission by the antenna (435).

Optical-to-Electrical converters (420-423) are located at the optical ports (440 and 445) of the remote unit (205). Each optical port (440 and 445) has an input and an output that are each coupled to an Optical-to-Electrical converter (420-423).

Since the remote unit (205) operates with electrical signals that are represented by the optical signals coming in through the optical ports (440 and 445), the Optical-to-Electrical converters (420-423) are responsible for converting the optical signals to electrical signals for processing by the remote unit (205). The Optical-to-Electrical converters (420-423) are also responsible for converting received electrical signals from electrical to an optical representation for transmission over the optical fiber.

A wavelength division multiplexer (WDM) (430 and 431) is located at each optical port (440 and 445). The WDMs (430 and 431) perform the optical processing necessary to combine several optical signals having several wavelengths. The WDMs (430 and 431) also perform the optical demultiplexing necessary to split the multiple wavelengths of a single fiber to their own signal paths.

In summary, the distributed digital antenna system provides multiple daisy-chained antennas on a single medium such as optical fiber. The fiber can be tapped anywhere along its length multiple times to provide economical radio coverage in areas where a base station would be cost prohibitive.

Numerous modifications and variations of the present invention are possible in light of the above teachings. It is therefore to be understood that within the scope of the appended claims, the invention may be practiced otherwise than as specifically described herein.

What is claimed is:

1. A distributed digital antenna system comprising:
   a host unit that converts a first signal to a transmitted digital optical signal and that converts a received digital optical signal to a second signal;
   an optical medium coupled to the host unit to carry the transmitted and received digital optical signals; and
   a plurality of remote units daisy-chained along the optical medium such that each remote unit transmits an analog representation of the transmitted digital optical signal and receives radio frequency signals that are converted by the remote unit to a digitized received spectrum, each of the remote units including a summer that sums the digitized received spectrum with a corresponding digitized received spectrum from any preceding remote unit of the daisy-chained remote units to generate the received digital optical signal for transmission to the host unit.

2. The system of claim 1 wherein the first and second signals are transported over an optical, electrical or wireless medium.

3. The system of claim 1 wherein the optical medium is an optical fiber.

4. The system of claim 1 and further including a base station, coupled to the host unit, that communicates with subscriber units over a radio frequency air interface.

5. The system of claim 4 wherein the base station transmits the first signal and receives the second signal.

6. The system of claim 4 wherein the base station communicates signals from the host unit to a public switched telephone network.

7. A distributed digital antenna system that communicates signals with a base station that is coupled to a data network, the system comprising:
   a host unit that converts radio frequency signals from the base station to digital optical signals and that converts digital optical signals from the digital antenna system to radio frequency signals for use by the base station;
   an optical medium coupled to the host unit that carries the digital optical signals; and
   a plurality of remote units daisy-chained along the optical medium such that each remote unit transmits radio frequency signals over an air interface as an analog representation of the digital optical signals from the base station and receives radio frequency signals over the air interface that are converted by a receiving remote unit to a digitized received spectrum, each of the remote units and the receiving remote unit including a summer that sums the digitized received spectrum with a corresponding digitized received spectrum from any preceding remote unit of the daisy-chained remote units to generate the received digital optical signals for use by the host unit.

8. The system of claim 7 wherein the radio frequency signals between the base station and the host unit are carried over an optical link.

9. The system of claim 7 wherein the optical medium is an optical fiber that carries multiple wavelengths.

10. The system of claim 7 wherein the optical medium is a first optical fiber that carries a first wavelength from the host unit to the plurality of remote units and a second optical fiber that carries a second wavelength from the plurality of remote units to the host unit.

11. The system of claim 10 wherein the second wavelength carries a digital signal that represents a summation of signals received by each of the plurality of remote units.

12. The system of claim 7 wherein the plurality of remote units each comprise:
   an antenna that communicates the radio frequency signals over the air interface;
   a plurality of optical-to-electrical converters that convert forward link digital optical signals input to the remote unit to forward link digital electrical signals and that convert reverse link electrical signals in the digitized received spectrum to reverse link digital optical signals for output to the host unit;
   a digital to analog converter that converts the forward link digital electrical signals to the analog representation;
   an analog-to-digital converter that converts the received radio frequency signals to the reverse link electrical signals in the digitized received spectrum; and
   wherein the summer sums the reverse link electrical signals in the digitized received spectrum with corresponding reverse link electrical signals in the digitized received spectrum from the preceding remote units of the optical medium daisy-chain to generate the received digital optical signals.

13. A remote unit in a distributed digital antenna system that communicates signals with a base station, the remote unit comprising:
   an antenna that communicates radio frequency signals using an air interface standard;

a plurality of optical-to-electrical converters that convert input digital optical signals, from a host unit coupled to the base station and a daisy-chain of previous remote units, to forward link digital electrical signals;

a digital to analog converter that converts the forward link digital electrical signals to analog signals for transmission by the antenna as radio frequency signals;

an analog-to-digital converter that converts radio frequency signals from the antenna to a digitized spectrum of reverse link electrical signals; and a summer that sums the reverse link electrical signals in the digitized spectrum from the analog-to-digital converter to corresponding reverse link electrical signals from the daisy-chain of previous remote units to generate an output digital optical signal.

14. The remote unit of claim 13 and further including:

a first optical port that is coupled to either the host unit or a subsequent remote unit of the daisy-chain of remote units; and a second optical port that is coupled to the daisy-chain of previous remote units.

15. The remote unit of claim 13 wherein a first optical-to-electrical converter of the plurality of optical-to-electrical converters converts an optical summation signal from the daisy-chain of previous remote units to the output digital optical signal and a second optical-to-electrical converter converts an optical transmit signal from the host unit to the forward link digital electrical signal for conversion to an analog signal by the digital to analog converter.

16. A remote unit in a distributed digital antenna system that communicates signals with a base station, the remote unit comprising:

an antenna that communicates radio frequency signals using an air interface standard;

a plurality of optical-to-electrical converters that convert digital optical signals, from a host unit coupled to the base station and a daisy-chain of previous remote units, to forward link digital electrical signals, the plurality of optical-to-electrical converters further convert reverse link digital electrical signals to digital optical signals, each digital optical signal comprising a wavelength;

a digital to analog converter that converts the forward link digital electrical signals to analog signals for transmission by the antenna as radio frequency signals;

an analog-to-digital converter that converts radio frequency signals from the antenna to a digitized spectrum of reverse link electrical signals;

a summer that sums the reverse link electrical signals in the digitized spectrum from the analog-to-digital converter to an output digital optical signal from the daisy-chain of previous remote units; and a wavelength division multiplexer that demultiplexes an input digital optical signal, comprising a plurality of wavelengths, to the digital optical signals each having a wavelength in the plurality of wavelengths, the wavelength division multiplexer further multiplexes digital optical signals to the output digital optical signal comprising the plurality of wavelengths.

17. A method for communicating over a distributed digital antenna system, the method comprising:

converting a first radio frequency signal from a base station to a digital optical signal;

transmitting the digital optical signal over an optical medium to a plurality of remote units in a daisy-chain configuration along the optical medium;

converting the digital optical signal to a forward link digital electrical signal at each remote unit;

converting the forward link digital electrical signal to an analog signal for transmission by at least one of the remote units as a second radio frequency signal;

receiving a third radio frequency signal over an air interface of at least one of the remote units;

converting the third radio frequency signal to a received electrical signal within a digitized spectrum; and summing the digitized spectrum of the received electrical signal with a corresponding digitized spectrum of received electrical signals from previous remote units in the daisy-chain configuration.

18. The method of claim 17 and further including:

converting a result of the summing of the digitized spectrum of the received electrical signals to a digital optical signal;

transmitting the digital optical signal over the optical medium; and converting the digital optical signal to a fourth radio frequency signal for use by the base station.

19. The method of claim 17 and further including demultiplexing the digital optical signal into a plurality of optical signals each having one wavelength.

20. The method of claim 18 and further including the base station transmitting information in the fourth radio frequency signal to a public switched telephone network.

21. The method of claim 18 and further including multiplexing single wavelength optical signals from the remote unit into a single optical signal comprising a plurality of wavelengths.

22. A method for a remote terminal to communicate with a wireless terminal in a geographic area, the method comprising:

converting an optical signal to a forward link electrical signal;

converting the forward link electrical signal to a forward link analog signal;

transmitting the forward link analog signal to the wireless terminal;

receiving a reverse link analog signal from the wireless terminal;

converting the reverse link analog signal to a reverse link electrical signal;

summing a digitized spectrum of the reverse link electrical signal with a corresponding digitized spectrum of other reverse link electrical signals from other remote terminals that are daisy-chained together over an optical link; and converting the summed digitized spectrum of reverse link electrical signals to a reverse link summed optical signal for transmission to a host unit.

23. The system of claim 1, wherein the host unit receives a total digitized received spectrum representing the sum of all digitized received spectrum from the plurality of remote units.

24. The method of claim 22, wherein the summed digitized spectrum of reverse link electrical signals represents a sum of the digitized spectrum of the reverse link electrical signals of all the remote terminals that are daisy-chained together over the optical link.

* * * * *